(12) United States Patent
Bolcar

(10) Patent No.: US 7,090,796 B2
(45) Date of Patent: Aug. 15, 2006

(54) SEMICONDUCTIVE COATING AND APPLICATION PROCESS FOR SHIELDED ELASTOMERIC ELECTRICAL CABLE ACCESSORIES

(75) Inventor: John Paul Bolcar, Bangor, PA (US)

(73) Assignee: Thomas & Betts International, Inc., Sparks, NV (US)

( * ) Notice: Subject to any disclaimer, the term of this patent is extended or adjusted under 35 U.S.C. 154(b) by 402 days.

(21) Appl. No.: 10/339,054

(22) Filed: Jan. 9, 2003

(65) Prior Publication Data

US 2003/0134538 A1  Jul. 17, 2003

Related U.S. Application Data

(60) Provisional application No. 60/347,192, filed on Jan. 9, 2002.

(51) Int. Cl.
*B29C 45/14* (2006.01)
*B29C 39/10* (2006.01)

(52) U.S. Cl. .................... 264/135; 264/236; 264/255; 264/259

(58) Field of Classification Search ................ 264/104, 264/105, 134, 135, 236, 250, 254, 255, 259, 264/294; 439/610
See application file for complete search history.

(56) References Cited

U.S. PATENT DOCUMENTS

| | | | |
|---|---|---|---|
| 3,243,756 A | | 3/1966 | Ruete et al. |
| 3,344,391 A | | 9/1967 | Ruete |
| 3,769,395 A | * | 10/1973 | Schmacher ............... 264/102 |
| 3,935,042 A | | 1/1976 | Wahl |
| 3,955,043 A | * | 5/1976 | Palmer et al. ........... 174/84 R |
| 3,970,488 A | * | 7/1976 | Nelson ..................... 156/49 |
| 3,993,387 A | | 11/1976 | Venezia |
| T953,007 I4 | | 12/1976 | Tachick et al. |
| 4,241,004 A | * | 12/1980 | Hervig ..................... 264/262 |
| 4,289,721 A | * | 9/1981 | Ishise ....................... 264/85 |
| 4,586,970 A | * | 5/1986 | Ishise et al. ............... 156/48 |
| 5,201,903 A | * | 4/1993 | Corbett et al. ............. 29/872 |
| 6,125,534 A | * | 10/2000 | Varreng .................... 29/869 |

* cited by examiner

*Primary Examiner*—Angela Ortiz

(57) ABSTRACT

A method is provided for manufacturing a semiconductive insulating shield for an electrical cable accessory. The method includes providing a substrate having a desired contour in relation to the electrical cable accessory. The substrate is then coated with an elastomeric semiconductive material to form a coated substrate. An elastomeric insulating dielectric material is then molded around the coated substrate, and the elastomeric semiconductive material and elastomeric insulating dielectric material are cured by applying heat and pressure sufficient to transfer the elastomeric semiconductive material to the elastomeric insulating dielectric material by chemical bonding.

7 Claims, 3 Drawing Sheets

SEMICONDUCTIVE COATING AND APPLICATION PROCESS FOR SHIELDED ELASTOMERIC ELECTRICAL CABLE ACCESSORIES

CROSS-REFERENCE TO RELATED APPLICATIONS

This application claims priority to Provisional Application 60/347,192, filed Jan. 9, 2002 which is hereby incorporated by reference.

FIELD OF THE INVENTION

The present invention relates to shielded electrical cable accessories. More particularly, the present invention relates to a method for manufacturing a semiconductive shield useful for providing geometric electrical stress control and shielding to medium and high voltage electrical cable accessories.

BACKGROUND OF THE INVENTION

Termination or connection of high or medium voltage electrical cables in the field requires electrical shielding or stress control. Geometric electrical stress control and/or shielding of elastomeric cable accessories may be generally accomplished by one of the two following methods.

In one method, an elastomeric semiconductive geometric stress control insert is pre-molded in one manufacturing operation. The insert is subsequently bonded to an elastomeric insulating dielectric in a second molding operation. This method has certain disadvantages. The pre-molded semiconductive components are nominally 0.020 inches thick or thicker. The component, therefore, must be trimmed of flash and cleaned. Also, the components must be specially stored to accommodate the secondary molding and bonding process. The thicker pre-molded semiconductive components may impart undesirable physical characteristics to the final product. These characteristics include higher modulus, resulting in a stiffer final product. This is especially significant in the wide range of cable accessory designs where the product is radially expanded significantly and the modulus must be controlled.

Another method includes molding the elastomeric insulating dielectric by one process and applying a semiconductive coating in a second process. This semiconductive coating may be applied by conventional techniques such as brushing, dipping, or spraying. This technique also has certain disadvantages. The application of the secondary coating to irregular interior surfaces is very difficult to achieve effectively and is costly to apply. Chemical cross-linking (chemical bonding) between an elastomeric semiconductive coating and an elastomeric insulating dielectric cannot be satisfactorily achieved unless the coating is subsequently cured or vulcanized by using heat and/or pressure during a secondary operation. The shelf life of these components is limited in that the coatings are reactive systems containing catalysts.

It is therefore desirable to provide a coating and application process for an elastomeric electrical cable accessory which is more reliable and cost-effective to achieve.

SUMMARY OF THE INVENTION

The present invention provides methods for manufacturing a semiconductive shield useful for providing electrical stress control and shielding to medium and high voltage electrical cable accessories.

In a first aspect of the invention, a method is provided for manufacturing a semiconductive shield for an electrical cable accessory. The method includes providing a substrate having a desired contour in relation to the electrical cable accessory. The substrate is then coated with an elastomeric semiconductive material to form a coated substrate. The substrate should be a material to which the elastomeric semiconductive material will not bond during curing. Examples of substrate materials include steel, stainless steel, aluminum, and polytetrafluoroethylene. The constituents of the elastomeric semiconductive material can be suspended in suspension solvents, in which case it is preferable to permit the elastomeric semiconductive coating to dry before proceeding. An elastomeric insulating dielectric material is then molded around the coated substrate, and the elastomeric semiconductive material and elastomeric insulating dielectric material are cured by applying heat and pressure sufficient to transfer the elastomeric semiconductive material to the elastomeric insulating dielectric material by chemical bonding.

In a preferred embodiment, the method further includes the step of applying an outermost semiconductive jacket. More preferably, the method includes applying a pre-molded semiconductive jacket over the coated substrate leaving a space between the coated substrate and outer jacket, positioning a mold over the outer jacket; and molding the uncured insulating dielectric material around the coated substrate by applying the uncured insulating dielectric material into the space between the outer jacket and the coated substrate.

In another embodiment, the outer jacket is applied by coating the inner surface of a mold with semiconductive jacket material. The mold is then positioned over the coated substrate leaving a space between the coated inner surface of the mold and the coated substrate. Uncured elastomeric insulating dielectric material is molded around the coated substrate by applying the uncured insulating dielectric material into the space between the semiconductive jacket material and the coated substrate. The semiconductive jacket material, elastomeric insulating dielectric material, and elastomeric semiconductive material are then concurrently cured.

In another preferred embodiment, the elastomeric semiconductive material does not contain a catalyst. Rather, the uncured insulating dielectric material can include a catalyst, such as peroxide, which can enter the elastomeric semiconductive material during the curing step.

In another aspect of the invention, an article of manufacture is provided. The article of manufacture includes an elastomeric semiconductive material transferred to and chemically bonded with an elastomeric insulating dielectric material by molding the elastomeric insulating dielectric material around the elastomeric semiconductive material and concurrently curing the elastomeric insulating dielectric material and elastomeric semiconductive material.

In another aspect of the invention, a shield cable accessory is provided. The shield cable accessory includes a coating-formed elastomeric semiconductive material portion and an elastomeric insulating dielectric material portion molded about the elastomeric semiconductive material portion. The elastomeric semiconductive material portion and the insulating dielectric material portion are concurrently cured to effect transfer of the elastomeric semiconductive material portion to the elastomeric insulating dielectric material portion by chemical bonding.

The present invention will allow coating thickness as low as 0.0005 inches and requires only one molding operation. In addition, due to the method of applying the coating, there is no need for secondary operations of trimming flash or cleaning. The present invention also results in significant reduction of raw material usage without any adverse effects on the physical characteristics, especially the modulus or stiffness of the final product. The invention allows the transfer of coating from an intermediate exterior surface to any interior surface, regardless of the geometry or surface irregularity. The invention results in the transfer and subsequent cross-linking of the semiconductive coating simultaneously with the cure of the elastomeric insulating dielectric. Furthermore, it is contemplated that the formulated semiconductive coating may be made without a catalyst, thereby rendering the shelf life of the final product indefinite.

DETAILED DESCRIPTION OF THE INVENTION

The present invention provides a method for manufacturing a semiconductive shield capable of providing geometric electrical stress control and/or shielding to medium to high voltage electrical cable accessories. The process of the present invention includes the transfer of a conventionally applied elastomeric semiconductive coating from an intermediate substrate to an elastomeric insulating dielectric during cure of the coating and insulating dielectric.

The present invention includes an elastomeric semiconductive coating process by which an elastomeric semiconductive coating is transferred from an intermediate substrate to an elastomeric insulating dielectric during the cure of the coating and elastomeric insulating dielectric. The formulated elastomeric semiconductive coating may include, for example, an EPDM elastomer. However, the formulated coatings may also be based on silicon (VMQ) and other elastomeric polymers.

The elastomeric semiconductive coating used in the present invention does not require the use of a catalyst in the formulation. The catalyst may be provided in the elastomeric insulating dielectric. The catalyst, e.g., peroxide, infuses into the transferred elastomeric semiconductive coating during the molding process, resulting in cure of the transferred coating.

The constituents of the elastomeric semiconductive coating may be charged directly to a ball mill, pebble mill, or similar dispersion equipment and milled to a Hegmen fineness of grind of 2 or finer. These constituents may be alternatively mixed by a Banberry or similar internal mixer. The constituents can be suspended in suspension solvents.

Figure 1:
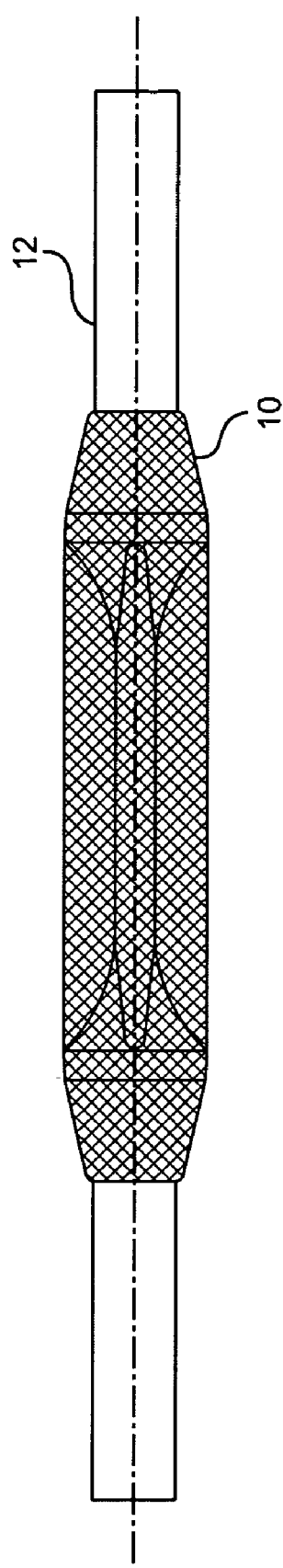
FIG. 1 is a plan view of a steel mandrel with an applied semiconductive coating.

As shown in FIG. 1, an uncured elastomeric semiconductive material is applied to an intermediate substrate 12, such as a mandrel, to form an elastomeric semiconductive coating 10. The substrate 12 is formed of a material from which the elastomeric semiconductive coating 10 will easily release during curing. Materials such as steel, stainless steel, aluminum, and polytetrafluoroethylene are found to be effective substrates. The substrate can be contoured in relation to an electrical cable accessory such that the semiconductive shield resulting from the process will have the desired shape to be operatively applied to the electrical cable accessory. Examples of electrical cable accessories include, for example, splices and connectors.

Conventional application techniques may be used to apply the elastomeric semiconductive coating 10 to the substrate 12. These application techniques include brushing, dipping, spraying, draw down or roller coating. Once applied, the coating is air-dried at ambient or elevated temperature to remove suspension solvents.

Figure 2:
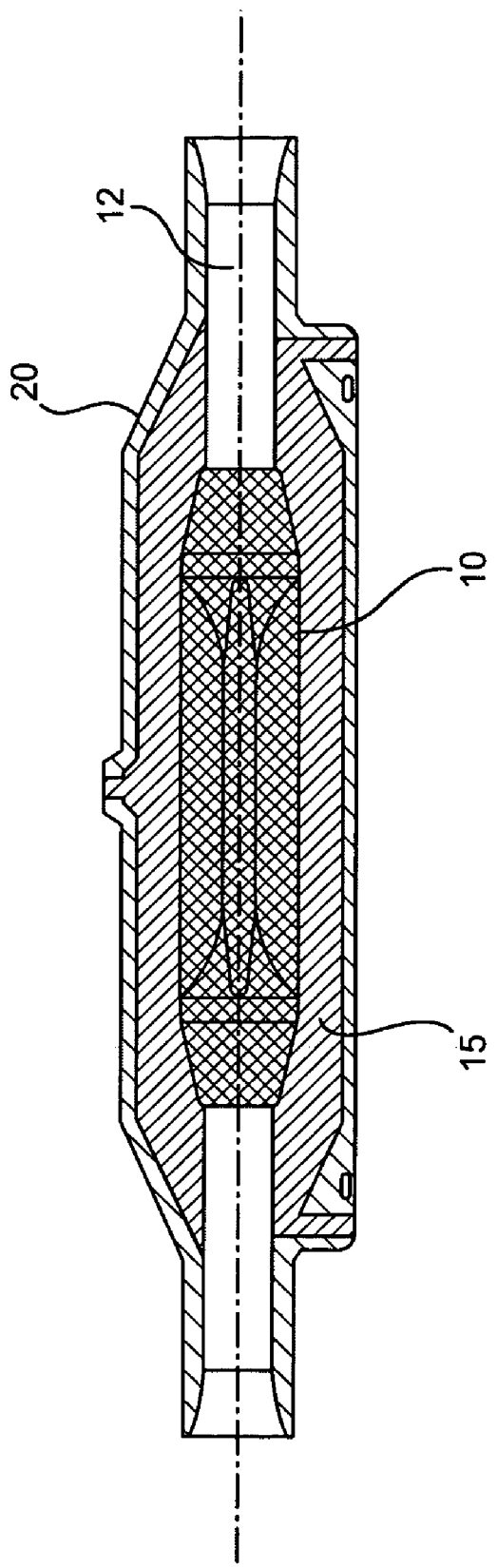
FIG. 2 is a plan view of a steel mandrel with an applied semiconductive coating, insulative dielectric material, and outer semiconductive jacket.

As shown in FIG. 2, prior to curing, the coated substrate 12 is positioned in a mold (not shown). An uncured elastomeric insulating dielectric material 15 is molded around the coated substrate 12. Conventional molding techniques such as injection molding, transfer molding or compression molding may be used. When the elastomeric semiconductive coating 10 and the elastomeric insulating dielectric material 15 are cured under heat and pressure, the elastomeric semiconductive coating 10 transfers to the insulating dielectric component 15 by chemically bonding to the insulating dielectric component 15. This can occur, for example, by cross-linking of polymers in the elastomeric semiconductive coating 10 and the elastomeric insulating dielectric material 15. The constituents of the elastomeric insulating dielectric material 15 should be compatible with constituents in the elastomeric semiconductive coating 10 such that, after the curing step by vulcanization (heat and temperature), the coating 10 and the insulating dielectric material 15 have been bonded to form a single physical structure.

In addition, it is contemplated that the semiconductive shield will include an outermost semiconductive jacket 20 over the cured inner semiconductive coating and insulating dielectric material. In one embodiment, the outermost semiconductive jacket 20 is a pre-molded jacket.

Figure 3:
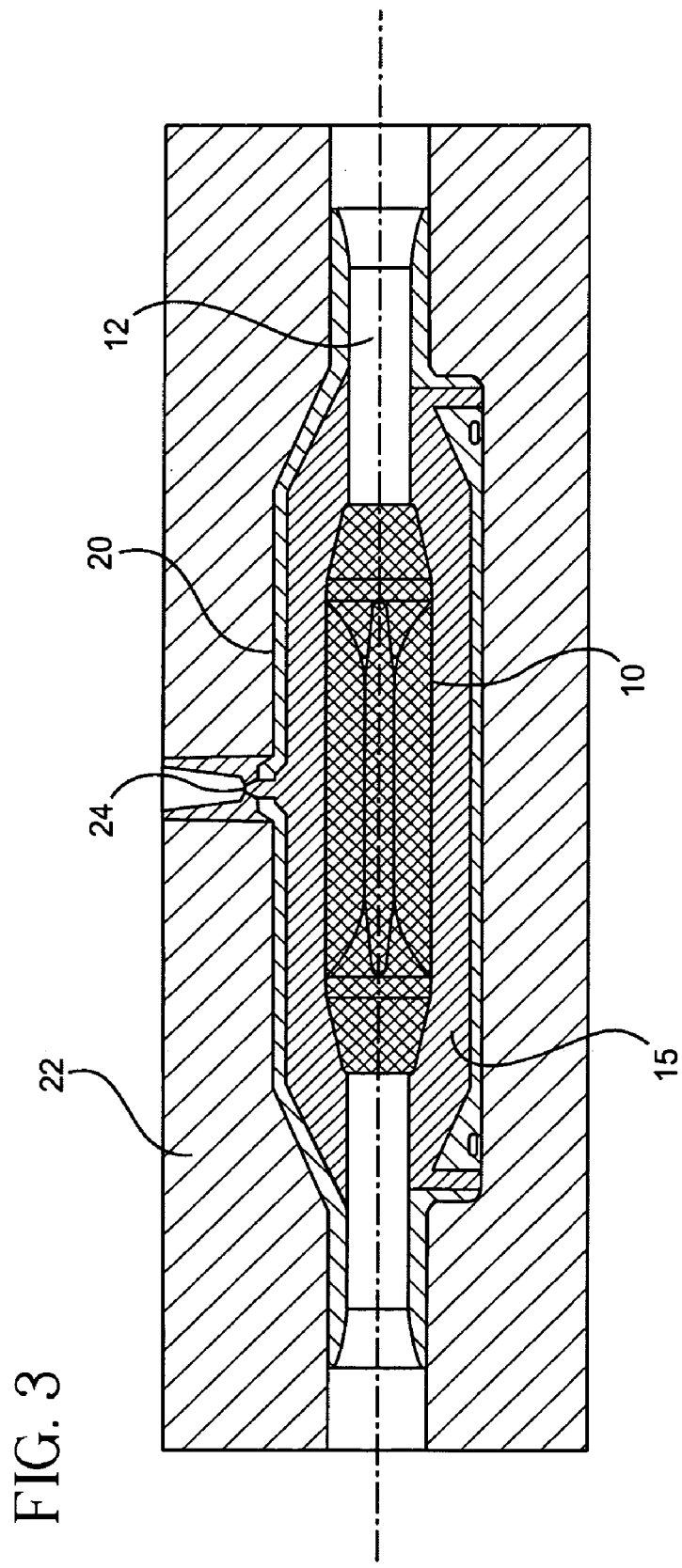
FIG. 3 is a plan view as set forth in FIG. 2, including a mold used to apply the insulative dielectric material over the semiconductive coating and under the outer semiconductive jacket, according to a preferred embodiment of the invention.

FIG. 3 shows a preferred embodiment according to the present invention. In FIG. 3, a pre-molded semiconductive jacket 20 is applied over the uncured elastomeric semiconductive material 10 coating the substrate 12, leaving a space (not shown) between the coating 10 and the semiconductive outer jacket 20. A mold 22 is then positioned over the outer jacket 20 and the uncured elastomeric insulating dielectric material 15 is applied into the space between the elastomeric semiconductive coating 10 and the outer jacket 20. The application of the uncured elastomeric insulating dielectric material 15 can be applied, for example, by injection molding through an opening 24 in the outer jacket 20 created by the mold 22. The elastomeric semiconductive material 10 and the insulating dielectric material 15 are then cured by applying heat and pressure to the mold.

The outer jacket 20 is semiconductive, as is the elastomeric semiconductive coating 10. Thus, the constituents of the outer jacket 20 and the coating 10 can be similar or the same. In addition, as described with regard to the elastomeric semiconductive coating 10, the constituents that form the semiconductive outer jacket 20 should be compatible with the constituents of the elastomeric insulating dielectric material 15 such that, upon curing of the elastomeric insulating dielectric material 15 and the elastomeric semiconductive coating 10, the insulating dielectric material bonds to the outer jacket 20 as well as the elastomeric semiconductive coating 10.

In another embodiment, the inside of the mold 22 can be coated with uncured semiconductive material that will form the outer jacket. This semiconductive material can be similar to or the same as the elastomeric semiconductive material used to coat the substrate. Upon vulcanization, the outer jacket, elastomeric insulating dielectric material, and inner elastomeric semiconductive material are concurrently cured causing bonding to occur between the outer jacket and dielectric material, as well as the inner semiconductive material and the dielectric material, thereby forming a single physical structure.

In another aspect of the invention, an article of manufacture is provided. The article of manufacture includes an elastomeric semiconductive material transferred to and chemically bonded with an elastomeric insulating dielectric material by molding the elastomeric insulating dielectric material around the elastomeric semiconductive material and concurrently curing the elastomeric insulating dielectric material and elastomeric semiconductive material.

In another aspect of the invention, a shield cable accessory is provided. The shield cable accessory includes a coating-formed elastomeric semiconductive material portion and an elastomeric insulating dielectric material portion molded about the elastomeric semiconductive material portion. The elastomeric semiconductive material portion and the insulating dielectric material portion are concurrently cured to effect transfer of the elastomeric semiconductive material portion to the elastomeric insulating dielectric material portion by chemical bonding.

What is claimed is:

1. A method for manufacturing a semiconductive shield for an electrical cable accessory, the method comprising:
    providing a substrate having a desired contour in relation to the electrical cable accessory;
    coating the substrate with an elastomeric semiconductive material to form a coated substrate;
    coating an inner surface of a mold with an uncured semiconductive jacket material;
    positioning the mold over the coated substrate, leaving a space between the coated inner surface of the mold and the coated substrate;
    molding an uncured elastomeric insulating dielectric material around the coated substrate by applying the uncured insulating dielectric material into the space between the semiconductive jacket material and the coated substrate; and
    concurrently curing the semiconductive jacket material, elastomeric insulating dielectric material, and elastomeric semiconductive material.

2. The method of claim 1, wherein said elastomeric semiconductive material comprises solvents.

3. The method of claim 2, wherein said solvents are evaporated before molding the uncured insulating dielectric material around the coated substrate.

4. The method of claim 1 wherein said substrate comprises at least one of steel, stainless steel, aluminum, and polytetrafluoroethylene.

5. The method of claim 1, wherein said elastomeric semiconductive material does not contain a catalyst.

6. The method of claim 1, wherein said uncured insulating dielectric material comprises a catalyst.

7. The method of claim 6, wherein said catalyst comprises peroxide.

* * * * *